No. 11,837. Reissued July 3, 1900.
W. M. DAVIS.
TELEPHONE REPEATER.
(Application filed Feb. 9, 1900.)
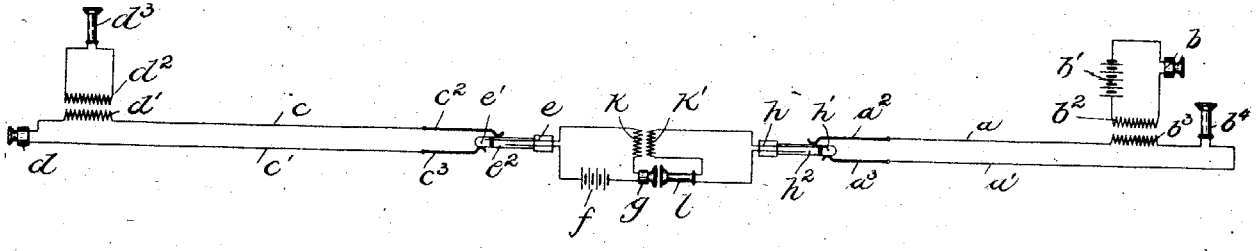
Witnesses
C. J. Schmidt.
May W. Zabel.
Inventor
William M. Davis
By Charles A. Brown & Cragg
Attorneys

UNITED STATES PATENT OFFICE.

WILLIAM M. DAVIS, OF CHICAGO, ILLINOIS, ASSIGNOR TO THE STROMBERG-CARLSON TELEPHONE MANUFACTURING COMPANY, OF SAME PLACE.

TELEPHONE-REPEATER.

SPECIFICATION forming part of Reissued Letters Patent No. 11,837, dated July 3, 1900.

Original No. 625,247, dated May 16, 1899. Application for reissue filed February 9, 1900. Serial No. 4,695.

*To all whom it may concern:*

Be it known that I, WILLIAM M. DAVIS, a citizen of the United States, residing at Chicago, in the county of Cook and State of Illinois, have invented a certain new and useful Improvement in Telephone-Repeaters, of which the following is a full, clear, concise, and exact description, reference being had to the accompanying drawing, forming a part of this specification.

My invention relates to a telephone-repeater, my object being to provide an improved construction and arrangement of repeater apparatus and circuits and apparatus associated therewith whereby two lines may be connected together for conversation, and I will point out my invention more particularly in the appended claims. In one embodiment of my invention one of the two lines to be connected is provided with a transmitter in a local circuit and connected through an induction-coil, while the other line is provided with a transmitter connected directly in circuit with a battery or other source of electricity located in the line. I do not wish to limit myself to this embodiment, however, as other embodiments may be made without departing from the spirit of my invention.

My invention in its preferred embodiment comprises a connecting device whereby two lines may be connected together for conversation, a transmitter and the primary of an induction or repeating coil being arranged to be connected in circuit with the telephone-line having the direct-connected transmitter, while the secondary of the induction-coil and a telephone-receiver placed opposite to the transmitter are arranged to be connected in circuit with the telephone-line having the transmitter in a local battery-circuit. I preferably provide a pair of lugs each having two contacts, the transmitter and the primary of the induction-coil being included between the contacts of one plug, while the receiver and the secondary of the induction-coil are included in circuit between the contacts of the other plug. When the direct-connected transmitter is operated, the talking-current traversing the primary of the induction-coil induces similar currents in the secondary, which traverse the other telephone-line and actuate the receiver thereof. When the transmitter in the local battery-circuit is actuated, talking-currents are produced on the line, which traverse the receiver included in the circuit of the connecting device, and the vibration of the diaphragm of the receiver actuates the transmitter situated opposite thereto, and the transmitter produces talking-currents which traverse the receiver of the connected line.

I have illustrated my invention diagrammatically in the accompanying drawing, in which like letters refer to like parts.

Upon the right is shown, for the purpose of illustration, a telephone-line having two limbs $a$ $a'$ extending to contact-springs $a^2$ $a^3$ at the central station, the transmitter $b$ being included in a local circuit with the battery $b'$ and the primary $b^2$ of an induction-coil, the secondary $b^3$ thereof and the receiver $b^4$ being included directly in the telephone-circuit. Upon the left I have illustrated a telephone-line comprising two limbs $c$ $c'$ extending to the line-springs $c^2$ $c^3$ at the central station, the transmitter $d$ being connected directly in the telephone-circuit with the primary $d'$ of an induction-coil, the secondary $d^2$ of which is included in circuit with the receiver $d^3$. At the central station is provided a connecting device comprising a pair of plugs $e$ $h$, the plug $e$ having a pair of contacts $e'$ $e^2$, in circuit with which are connected a battery $f$, a transmitter $g$, and the primary $k$ of an induction-coil. The plug $h$ is provided with two contacts $h'$ $h^2$, in circuit with which are connected the receiver $l$ and the secondary $k'$ of an induction-coil.

When the subscribers desire to converse, the signals are sent to the central station in any of the usual ways (the calling apparatus having been omitted from the drawing for clearness, as it forms no part of the present invention) and the operator inserts the plug $h$ in the spring-jack of the subscriber having the transmitter in the local circuit and inserts the plug $e$ in the spring-jack of the subscriber having the direct-connected transmitter. When the transmitter $d$ is actuated, talking-currents are produced in the circuit, which may be traced from battery $f$ through contact $e^2$, line-spring $c^2$, limb $c$, primary $d'$, transmitter $d$, limb $c'$, spring $c^3$, contact $e'$, primary $k$, telephone $g$, back to the battery. The currents thus traversing the primary $k$ induce currents in the secondary $k'$, which pass through receiving-telephone $l$, contact $h^2$, line-spring $a^2$, limb $a$, secondary $b^3$, receiver $b^4$, limb $a'$, spring $a^3$, contact $h'$, back to the secondary. When transmitter $b$ is actuated, the talking-currents from battery $d'$ traverse the primary $b^2$, thus inducing currents in secondary $b^3$, which pass over the telephone-line and through the receiver $l$ at the central station, which actuate the transmitter $g$ to thereby produce talking-currents in the circuit of battery $f$, which may be traced through the transmitter $g$, primary $k$, over limb $c'$, transmitter $d$, primary $d'$, limb $c$, back to the battery. The talking-currents traversing the transmitter $d$ induce currents in the secondary $d^2$, which traverse the receiver $d^3$. I have thus devised a telephone system having a circuit serving to transmit or propagate voice-currents from either of the telephone-stations united thereby to the other in combination with means for reimpressing voice-currents traversing the circuit and a battery or other generator acting as a supplemental source for the reimpressed currents. There is thus created a telephonic boosting effect upon the telephone-circuit.

My invention is applicable to telephone systems wherein part of the transmitters are directly connected and part in local circuit, and is also applicable to the connection of lines of different exchanges having this difference of construction, and is also applicable to the connection of lines of a telephone system with a toll-line. There are perhaps other applications where my invention may be employed to advantage; but it has been designed with particular reference to the applications above mentioned. The connector above described may also be used to advantage in joining together a telephone-line having a magneto-transmitter and a line having a direct-connected microphone-transmitter. I do not wish to be limited to the precise arrangement of apparatus and circuits herein disclosed, as modifications may readily be made without departing from the spirit of my invention, nor do I wish to limit myself to telephone-lines inductively united in a single telephone-circuit.

Having described my invention, what I claim as new, and desire to secure by Letters Patent, is—

1. The combination with a telephone-line having a source of electricity and a microphone-transmitter connected directly in the line, of a second telephone-line having means for producing talking-currents on the line, and a repeater interposed between the two lines comprising a microphone-transmitter and the primary of an induction-coil in circuit with the first line and a telephone-receiver and the secondary of an induction-coil in circuit with the second line, the transmitter and the receiver of the repeater being opposed in position so that the receiver vibrates the transmitter-diaphragm, substantially as described.

2. The combination with a telephone-line having a source of electricity and a microphone-transmitter connected directly in the line, of a second telephone-line having a microphone-transmitter in a local circuit connected with the telephone-line through an induction-coil, and a repeater interposed between the two lines comprising a microphone-transmitter and the primary of an induction-coil in circuit with the first line, and a telephone-receiver and the secondary of an induction-coil in circuit with the second line, the transmitter and the receiver of the repeater being opposed in position so that the receiver vibrates the transmitter-diaphragm, substantially as described.

3. The combination with a telephone-line having a microphone-transmitter connected directly in the line, of a second telephone-line having means for producing talking-currents on the line, and a connecting device for joining the said lines together comprising two pairs of terminals one pair being adapted to be connected with the first line and having in circuit between the same a source of electricity, a microphone-transmitter and the primary of an induction-coil, the second pair of terminals being adapted to be connected with the second telephone-line and having in circuit therewith the secondary of an induction-coil and a receiver situated opposite said transmitter, substantially as described.

4. In a telephone system, the combination with a telephonic circuit extending between telephone-stations, said telephonic circuit serving to propagate voice-currents from either telephone-station to the other, of a repeater associated with the telephonic circuit comprising two inductively-related windings traversed by currents due to the telephonic apparatus at the stations, a receiving element or receiver, and a transmitting element or transmitter associated with said inductively-related windings, the receiving element acting upon the transmitting element, substantially as described.

5. In a telephone system, the combination with a telephonic circuit extending between telephone-stations, of a repeater associated with the telephonic circuit comprising two inductively-related windings traversed by voice-currents, a battery-transmitter and a battery therefor in circuit with one of the windings, and a receiver in circuit with the remaining winding and acting upon the transmitter, substantially as described.

6. In a telephone system, the combination with a telephonic circuit extending between telephone-stations, of a winding traversed by voice-currents, a receiver in circuit therewith, a second winding in inductive relation with the aforesaid winding, and a battery-transmitter with its battery in circuit with the said second winding, the said receiver acting upon the said transmitter to vary the current of the transmitter-circuit, the said inductively-related windings serving to propagate voice-currents in the telephonic circuit, substantially as described.

7. In a telephone system, the combination with a telephonic circuit extending between telephone-stations, of a winding traversed by voice-currents, a receiver in circuit therewith, a battery-transmitter acted upon by the receiver, to vary the resistance between the transmitter-electrodes, a second winding traversed by voice-currents and in inductive relation with the aforesaid winding and a battery in circuit with the second winding and the transmitter, substantially as described.

8. In a telephone system, the combination with a telephonic circuit extending between stations, of an induction-coil with its secondary winding traversed by voice-currents emanating from a telephone-station, a receiver in circuit with the said secondary winding, a battery-transmitter, and a battery therefor in circuit with the transmitter and the primary winding of the induction-coil, the said receiver acting upon the transmitter to vary the current of the transmitter-circuit, the said induction-coil serving to propagate voice-currents in the telephonic circuit, substantially as described.

9. In a telephone system, the combination with a telephonic circuit extending between telephone-stations, of an induction-coil, a receiver in circuit with the secondary winding of the induction-coil, a battery-transmitter acted upon by the receiver to vary the resistance between the transmitter-electrodes, and a battery for the transmitter in circuit with the primary winding of the induction-coil, the said induction-coil serving to propagate voice-currents in the telephone-circuit, substantially as described.

10. In a telephone system, the combination with two telephone-lines extending to telephone-stations and united to establish telephonic communication between the telephone-stations, of inductively-related windings serving to propagate voice-currents between the telephone-stations, each telephone-line including one of the said windings, a receiver in circuit with one winding, and a transmitter and battery in circuit with the other winding, the said receiver acting upon the transmitter to vary the current in the transmitter-circuit, substantially as described.

11. In a telephone system, the combination with two telephone-lines extending from telephone-stations and united for conversation, of an induction-coil for propagating voice-currents over the telephonic curcuit, a receiver and the secondary of the induction-coil being in circuit with a telephone-line, a battery with the primary of the induction-coil in circuit with the other telephone-line, and a transmitter in circuit with the battery and primary of the induction-coil, the receiver acting upon the transmitter to vary the current flowing through the latter, substantially as described.

12. In a telephone system, the combination with a telephonic circuit extending between stations and serving to propagate or transmit voice-currents from either of the telephonically-united stations to the other, of a receiver traversed by voice-currents and a transmitter acted upon by said receiver and serving to reimpress voice-currents passing to a telephone-station, substantially as described.

In witness whereof I hereunto subscribe my name this 3d day of February, A. D. 1900.

WILLIAM M. DAVIS.

Witnesses:

GEORGE L. CRAGG,
FLORENCE WICKLIN.